United States Patent

Korst et al.

[11] Patent Number: 6,061,732
[45] Date of Patent: May 9, 2000

[54] DATA STREAMING SYSTEM UTILIZING AN ASYNCHRONOUS TECHNIQUE FOR RETRIEVING DATA FROM A STREAM SERVER

[75] Inventors: Johannes H.M. Korst; Pascal F.A. Coumans, both of Eindhoven, Netherlands

[73] Assignee: U. S. Philips Corporation, New York, N.Y.

[21] Appl. No.: 09/070,215

[22] Filed: Apr. 30, 1998

[30] Foreign Application Priority Data

May 26, 1997 [EP] European Pat. Off. .............. 97201590
Nov. 20, 1997 [EP] European Pat. Off. .............. 97203621

[51] Int. Cl.[7] .............................. G06F 15/16; G06F 3/00; G06F 3/023; G06F 12/00
[52] U.S. Cl. ................................ 709/231; 710/6; 710/53; 711/100; 711/152
[58] Field of Search ........................... 709/231; 711/100, 711/152; 710/6, 53

[56] References Cited

U.S. PATENT DOCUMENTS

| | | | |
|---|---|---|---|
| 4,972,396 | 11/1990 | Rafner | 369/32 |
| 5,757,415 | 5/1998 | Asamizuya et al. | 348/7 |
| 5,761,417 | 6/1998 | Henley et al. | 709/231 |
| 5,848,437 | 12/1998 | Korst | 711/157 |
| 5,884,004 | 3/1999 | Sato | 386/98 |
| 5,926,649 | 7/1999 | Ma et al. | 395/873 |
| 5,950,015 | 9/1999 | Korst et al. | 395/826 |

OTHER PUBLICATIONS

Dey et al; "Storage Subsystem Design in a large multimedia server for high–speed Network Environments" SPIE Proceedings, vol. 21 88, pp. 200–211, 1994.

"Randomized Data Allocation for Real–Time Disk I/O", Steven Berson, R.R. Muntz, W.R. Wong, COMPCON '96 (41st IEEE Computer Society International Conference, Santa Clara, Feb. 25–28. 1996).

"Algorithmic Graph Theory", Alan Gibson, Cambridge University Press, 1989, pp. 96–106.

"Balanced Allocations", Y. Azar E.A. ACM Symposium on the Theory of Computing, pp. 593–602, 1994.

*Primary Examiner*—Krisna Lim
*Attorney, Agent, or Firm*—Daniel J. Piotrowski

[57] ABSTRACT

In an audio/video server blocks of data are read from a storage medium by a reader and supplied to users in the form of data streams. The storage medium comprises a plurality of record-carrier based storage units. A reader reads a batch of data units from a storage unit in a single relative movement of a reading head of the storage unit with respect to the record-carrier of the storage unit. A scheduler controls reading of blocks from the storage medium by determining from which storage unit(s) data unit(s) need to be read for the block and placing a corresponding carrier access request in a read queue. The scheduler extracts for each of the storage units a batch of carrier access requests from the queue and issues the batch to the reader in an asynchronous manner, in response to the reader having substantially completed reading data units for a previous batch for the storage unit.

9 Claims, 5 Drawing Sheets

DATA STREAMING SYSTEM UTILIZING AN ASYNCHRONOUS TECHNIQUE FOR RETRIEVING DATA FROM A STREAM SERVER

The invention relates to a system for retrieving blocks of data, such as audio and/or video data, from a storage medium and supplying the blocks in the form of a plurality of data streams to users; the storage medium comprising a plurality of record-carrier based storage units; the block comprising at least one data unit, where a data unit is stored on one of the storage units; the system comprising:
   a reader for, for each of the storage units, servicing a batch of carrier access requests by reading a corresponding batch of data units in a single relative movement of a reading head of the storage unit with respect to the record-carrier of the storage unit; each unit of the batch of data units being associated with one of the carrier access requests of the batch of carrier access requests; and
   a scheduler for controlling reading of data blocks for the data streams from the storage units by determining for at least one data unit of each block in which storage unit the data unit is stored and placing a carrier access request in a read queue; the carrier access request being associated with the data unit and the determined storage unit; and cyclically extracting for each of the plurality of storage units a batch of carrier access requests associated with the storage unit from the read queue; and issuing the batches to the reader.

A system of this kind is used in a multimedia server and, more specifically, in a video-on-demand or near-video-on-demand server. A general requirement in such systems is to supply a continuous, un-interrupted stream of data to each active user. Typically, data is read from conventional disk based storage media, such as hard disks, which are arranged in a disk array, such as a RAID system. In general, a distinction can be made between a fixed consumption rate and a variable consumption rate system. In a fixed consumption rate system data is, typically, supplied to a user as a fixed rate data stream. Usually, the rate is identical for each stream in the system. An example of such a system is a near-video-on-demand system, wherein a number of films can be played in parallel and the same film may be played several times in parallel, where regularly, for instance, every five or fifteen minutes, a new copy of the same film is started. In a variable consumption rate system the rate at which a user consumes data varies over time. Typically, a maximum consumption rate can be defined for each data stream. In practice, usually an identical maximum consumption rate is used for all streams, although it may be possible to efficiently support streams with different maximum consumption rates (e.g. one maximum for an audio stream and another maximum for a combined video and audio stream). Variable consumption rate systems are, for instance, used for systems which support VCR-like functions such as pause or slow motion, or systems which use a data compression scheme capable of a variable bit rate encoding, such as MPEG-2.

The system comprises a reader for reading data blocks from each of the storage units of the storage medium. From a disk-based record carrier, data is retrieved as a Disk Access Block (DAB). DABs which are successively read from a same disk will typically not be stored contiguously on the disk. Usually, DABs which are successively read from the same disk belong to different files (where a file is the collection of blocks belonging to one title) since the disk has to supply DABs for a plurality of data streams in some interleaved manner. As a consequence, the disk head needs to be moved in between reading of DABs and the appropriate starting point of the next DAB has to be awaited. Such a switch takes a considerable time, during which no data can be read. To reduce the switching overhead, the so-called disk sweeping technique is frequently used. In such a scheme, the reader is able to read a number of DABs from a disk in one batch. The DABs of the batch are ordered based on their physical track position. For the read operation, the disk head is moved in only one direction (e.g. from an innermost to an outermost position from which data needs to be read or vice versa), only stopping to read the DABs of the batch. In this way, the switching overhead is reduced significantly. Similar techniques can be used for a tape-based record carrier, where one sweeping operation of a read head of a disk corresponds to one winding operation of the tape with respect to the read head. The read data blocks are stored in a buffer from which the data is supplied to the user as a data stream. Usually a separate buffer is allocated for each data stream.

To ensure that there is a sufficient amount of data in the buffers, a scheduling scheme is used. In principle, the scheduler determines for which stream data needs to be read and arranges that, for the streams requiring data, DABs are read from the disk(s). To this end a carrier access request for the DAB is put in a read queue. Periodically, the scheduler creates a batch of carrier access request for a disk by extracting carrier access requests for the same disk from the read queue and issues the batch to the reader. The read operation of the disks are started synchronously. If capacity is still available in the system, a new stream may enter the system at the start of a new cycle. After this new cycle has been completed, data may be consumed by the new stream. As such, the length of the interval determines the response time of the system, which on average is one and a half cycle.

In order to guarantee a continuous supply of data to the active streams at the desired data rate, the load on any of the disks may not be higher than can be read in a given time assuming a worst case performance of the disk. Typically the number of disks in the disk array is determined by the required total bandwidth in view of the number of data streams which need to be supported in parallel. To avoid that capacity is wasted load needs to be distributed relatively evenly over the disks of the systems. This is usually achieved by using a special storage scheme.

For a fixed consumption rate system, typically, the scheduler operates at fixed intervals. During such an interval, the reader reads for each stream a fixed amount of data (sufficient to last one interval) and stores the read data in the buffer. Load balancing can be achieved by using a storage scheme wherein successive blocks of a title are stored on successive disks (cyclically). By ensuring that for the different streams playback is started at a moment when the load on the disk with the first block of the title required to be played for the stream is below the maximum allowed, it is automatically guaranteed that the load never exceeds the maximum.

For a variable consumption rate system, the scheduling is more complicated since different streams may empty a predetermined block of the buffer at different moments. Typically, a variable bit-rate scheduler repeatedly determines which streams potentially require more data, i.e. which streams have a buffer with room for a new block of data. Other streams are skipped. As a consequence, the duration of the interval for reading data may be variable, bounded by the situation in which all active streams require a new data block. The most commonly used storage scheme is striping, wherein data to be supplied to a user is partitioned over all disks, such that a request for reading the data implies a disk access to each of the disks. As a result, the load on the disks is optimally balanced. It is also known to stripe data over a subset of all disks. A disk based storage server for 3D interactive applications, such as an architectural walk through a town like Los Angeles, is described in "Randomized data Allocation for Real-time Disk I/O", Compcon '96 (41st IEEE Computer Society International Conference, Santa Clara, Feb. 25–28, 1996). In this system which considers very large 3D models, at least on the order of a tera byte, a high peek bandwidth is required for presenting a new portion of the model when, due to an unpredictable action of the user, the new portion of the model becomes visible. To achieve the high bandwidth, a data block is typically striped over seven disks where each of the seven disks comprises one full track of data for the block. To ensure that the load on the disks is still reasonably balanced, the group of seven disks is randomly selected from the entire set of available disks. Six of the disks store a data unit with normal data (as supplied to the user) and one disk stores a data unit with parity data. The random distribution of the groups results in a statistical variation in the queue lengths. The variability can be decreased by reading only 6 units of the group of 7 units, where the units are read from disks with a low load. If the unread unit comprises normal data, the parity unit is used to reconstruct the unread unit.

It is an object of the invention to provide a system of the kind set forth with a reduced response time.

To achieve this object, the system according to the invention is characterised in that the scheduler is operative to perform the cyclic extraction for each of the storage units in an asynchronous manner, by for each individual storage unit issuing a batch of carrier access requests for the storage unit to the reader in response to the reader having substantially completed reading data units for a previous batch of carrier access requests for the storage unit. Due to variations in disk transfer rate (reading of data located on the outer track of a disk results in a transfer rate which is approximately 50% higher than reading from an inner track), variations in seek times and rotational latencies, some disks complete a sweep significantly faster than others. Instead of delaying a next sweep of an early finished disk until all disks have completed the sweep, a new batch of carrier access requests is issued to the disk upon completion of the just completed sweep of this disk. By not wasting the extra bandwidth capacity which results from a better average performance of the disks than the performance of the worst performing disk during a specific sweep, room is created for reducing the response times. Assuming that still capacity is available in the system for servicing an additional stream, in a conventional system a new stream can only enter the system until all currently active streams have been serviced and then has to wait one more cycle until data has been read for the stream. The servicing of the active streams may occur in one large cycle (resulting in one large sweep for each of the disks) or may be sub-divided into several smaller sub-cycles (each resulting in a sweep for each of the disks). Assuming a reasonably balanced system in which not one specific disk is continuously loaded more than the other disks, statistically seen, for successive cycles (or sub-cycles) the disk which performs worst will vary. By restarting reading, preferably immediately after a previous batch has been completed, a bad performance of a disk during a certain sweep can be compensated by a better performance during a next sweep. As such, the total duration of successive sweeps will be less than if all sweeps had been started synchronously. Consequently, an overall cycle duration as observed by the scheduler will be less, resulting in a reduced average-case response time. The simulations show that a significant reduction in average-case response times can be achieved by controlling the disks asynchronously. Simulations for a specific system have shown a reduction in average-case response times by a factor of 3. The more streams are active in the system, the better the performance of an asynchronous implementation of the system improves compared to a synchronous implementation.

The measure as defined in the dependent claim 2 describes that the scheduler maintains separate read sub-queues for each of the storage units. In this way determining a load on a disk and issuing batches of carrier access requests to a disk is straightforward. Preferably in response to an indication that a previous batch has been completed, the scheduler extracts a number of carrier access requests from the sub-queue of the disk and issues the requests as a batch to the disk reader. Depending on the scheduling algorithm, it may be preferred to issue all read access requests in the sub-queue to the disk reader (the larger the batch the more optimal the reading). Alternatively, up to a maximum number of carrier access requests may be issued at a time, giving the scheduler better control over the system.

According to the measure as defined in the dependent claim 3, the block is stored in a redundant form in the storage units, and the scheduler can choose from which storage units data units are read to reconstruct the block. As an example, the striping technique may be used, where the block is divided in data units and each data unit is stored on a different disk and at least one additional data unit is stored (again on a disk different from the one(s) used for storing the data unit(s) of the block) providing redundant information. As an example, the block may be divided into 7 data units, and an eighth block may be created using well known error detecting and correcting coding techniques (a simple one being an XOR operation over the 7 data units), where the 8 data units are stored in 8 different disks. In this example, only 7 of the 8 data units are required for reconstructing the block. As such, the scheduler has a choice between eight groups of seven disk to read data from, allowing the scheduler to balance the load on the storage units. Preferably, the storage units in which the data units of a block are stored are selected using a suitable algorithm. For instance, by selecting the storage units substantially randomly a relatively even load can be achieved during playback even for variable rate systems for which it is otherwise difficult or even impossible to predict how the load on individual storage units will develop in time for the active streams. It will be appreciated that in this way the duration of the (in fact imaginary) cycle of the scheduler on average is shorter, resulting in a reduced response time. In a simple system, all blocks of all titles are stored in a redundant form. The selection of blocks may alternatively be a part of all blocks, where the remaining blocks are stored only once.

The solution offered by this embodiment benefits from the insight that, unlike the bandwidth, capacity of the storage medium is not a major determining factor and increasingly will become less of a determining factor since capacity of hard-disks grows on average at a higher rate (typically 60% a year) than the bandwidth (typically a growth of 40% a year). Assuming that in two years time a typical disk will have a storage capacity of 25 Gbyte and a guaranteed data rate of 85 Mbits/sec, the following two scenario's can be envisioned. In a first scenario, a video-on-demand version of the system according to the invention is used to offer a range of up to 20 films, like in a cinema, to a maximum of a 1000 users. The films are encoded using MPEG2 at an average rate of 4 Mbits/sec. Assuming that on average a film has a length of 90 min., a total storage capacity of $90*60*4.10^6 = 21.6*10^9$ bits=2.5 Gbyte per film is required, resulting in a total required storage capacity of approximately 50 Gbyte. If all blocks are stored in a fully redundant form (twice the amount of data units than really required), the capacity will have to be approximately 100 Gbyte, corresponding to 4 or 5 disks. To be able to support simultaneously 1000 users, a total guaranteed bandwidth is required of 4000 Mbits/sec, which corresponds to 47 disks. Only if in such a system it is required to store over 235 films the storage capacity of the disks becomes relevant. In a more moderate second scenario in which the system according to the invention is used to offer up to a hundred users a choice of films, as is typical for a hotel, with respect to the bandwidth five disks are required. With full redundancy, the five disks can store 23 films which is more than is usually offered in such a system.

A further advantage of this embodiment lies in the improved robustness of the system. A failure of one (or even more) disks will not result in failure of the system, since the data can be retrieved from other disks storing data which can be used to reproduce the data which is no longer accessible.

According to the measure as defined in the dependent claim 4, some (or all of the) blocks are fully duplicated (or stored even more than two times) on separate disks. This embodiment is based on the insight that, although the data is stored more than once, in fact in a typical system less storage units are required in the system according to the invention than in a conventional system. As already shown for above scenarios, bandwidth is the limiting factor for most practical systems and increasingly will be even more so. By no longer striping data blocks across the individual storage units, but instead reading the entire block from one disk, the efficiency in reading data from the storage unit is improved. In the first scenario an efficiency improvement of just over 2% already results in saving a disk.

A further advantage of the system according to the invention lies in the improved robustness of the system. As an example, if one out of twenty disks fails and all blocks are duplicated, the scheduler will on average for one out of ten blocks not be able to choose from which unit the block should be read. No other measures such as parity disks are required.

Moreover, the extendibility of the system increases. If additional bandwidth (or storage capacity) is required an additional disk can be added to the system. The blocks to be moved from the already present disks to the new disk may be selected randomly. Typically, the number of blocks to be moved will substantially be the average number of blocks stored on a disk. In the system according to the invention, the impact on the operation of the system is very low. In a 50 disk system only 2% of the blocks need to be moved. All other blocks are entirely unaffected. Also, the moving operation can be performed whenever capacity is available to move a block (i.e. the operation can be performed in the background while the system is operational). As blocks are being moved to the new disk, slowly the capacity of the system increases until finally the desired number of blocks have been moved to the new disk. In contradistinction, for a typical system wherein blocks are striped over all disks, all disks need to be accessed and blocks may even need to be re-built in order to store data on the new disk. Such a major operation must usually be performed while the system is off-line.

The measure as defined in the dependent claim 5 describes a simple scheduling scheme wherein requests for fetching data blocks from the storage medium are handled individually by the scheduler and, typically, in the sequence as they arrive at the scheduler. For each request the scheduler determines, based on the then actual load resulting from already assigned carrier access requests in the read queue, which group of storage units storing all data units needed to reproduce the block has the lowest load.

The measure as defined in the dependent claim 6 balances the load by distributing the requests for a group of blocks to be read. This allows for a more even load compared to assigning the requests on an individual basis, where already assigned requests can no longer be influenced. As an example, assigning requests individually may result in the following situation. A request may be assigned to storage unit A which is chosen from two possible storage units A and B, having equal load. The load on a storage unit C is one higher than the initial load on A and B. For a next request a choice has to be made between storage units A and C. Since both A and C now have equal load, whatever choice is made it will always result in increasing the load on one of the storage units. By dealing with both request together in one group, the first request can be assigned to B and the second request to A, resulting in a lower maximum load on the three units.

It will be appreciated that in this embodiment the scheduler performs a higher level cyclic operation of determining which streams require a block and balancing the load on the storage units. Independently, the scheduler performs lower level cyclic operations of feeding batches of carrier access requests to each storage unit independent of the higher level cycle and the feeding cycle of the other storage units. The algorithm used for the higher level cycle may be any suitable conventional scheduling algorithm such as also used for systems based on only one synchronised cycle. Disks performing a relatively fast sweep will be re-fed earlier. As a consequence, the queue will contain less carrier access requests for these disks, resulting in more data access requests for new blocks being assigned to the at that moment faster performing disks. This relieves disks which at that moment perform slower sweeps, resulting in an overall faster operation and, consequently, reduced response times.

The measure as defined in the dependent claim 7 describes a simple scheduling scheme for balancing the load for a group of requests for new blocks wherein requests for fetching data blocks from the storage medium are handled individually by the scheduler and, typically, in the sequence as they arrive at the scheduler. For each request for a new block the scheduler determines, based on the then actual load resulting from already assigned carrier access requests, to which storage unit the request should be assigned, being the storage unit having the lowest load of all storage units which store the block to be read. Furthermore, requests currently being dealt with or already definitely issued to the reader (e.g. already issued to a hardware read request buffer storing requests for blocks to be read in a next sweeping operation of the disk) do not need to be considered.

According to the measure as defined in the dependent claim 8, an ever better load balance (resulting in an overall faster operation) can be achieved by re-balancing the system. The re-balancing is achieved by re-assigning a carrier access request for a data unit from one storage unit to another storage unit (from which the same data can be reproduced). Even if carrier access requests as a result of requests for new blocks have initially been assigned such that the system was balanced at that moment, the system can still benefit from a re-balancing at a later stage. For instance, as described earlier, disks will in general be able to service a batch faster than the worst case assumption when the initial assignment took place. Instead of trying to predict how fast an individual disk will perform a sweep for a given batch of carrier access requests and balance the system accordingly, it is simpler to re-balance the system afterwards. Furthermore, if requests for new blocks of data are assigned by successively dealing with a group of requests for new blocks, it can occur that when dealing with a group of requests it is detected that it would have been better if in the previous group one or more specific storage units had been loaded less. For instance, for a certain cycle the scheduler may have distributed new carrier access requests such that the load on all disk is (substantially) the same. For a next cycle, it turns out that a specific storage unit stores a very high percentage of the data units for the blocks to be handled in that cycle. If so, it would have been advantageous if in the previous cycle that storage unit had been loaded less. This can be achieved by re-assigning carrier access request which have not yet been definitely issued to the reader. A similar re-assignment may also take place within a cycle. For instance if blocks of a group are handled sequentially, towards the end of the assignment process it may appear that a lot of carrier access requests need to be assigned to a few storage units, whereas actually in the beginning carrier access requests have been assigned to those storage units which could have been assigned to other storage units. The re-balancing can be performed for the situation in which a block is stored as one data unit or is reproduced from a group of data units (in which case all assigned carrier requests for the data units of the group need to be removed from the queue, followed by selecting a new group and assigning new access requests).

The measure defined in the dependent claim 9 provides an effective and simple way of achieving an optimal load.

These and other aspects of the invention will be apparent from and elucidated with reference to the embodiments shown in the drawings.

DETAILED DESCRIPTION OF THE PREFERRED EMBODIMENT

Figure 1:
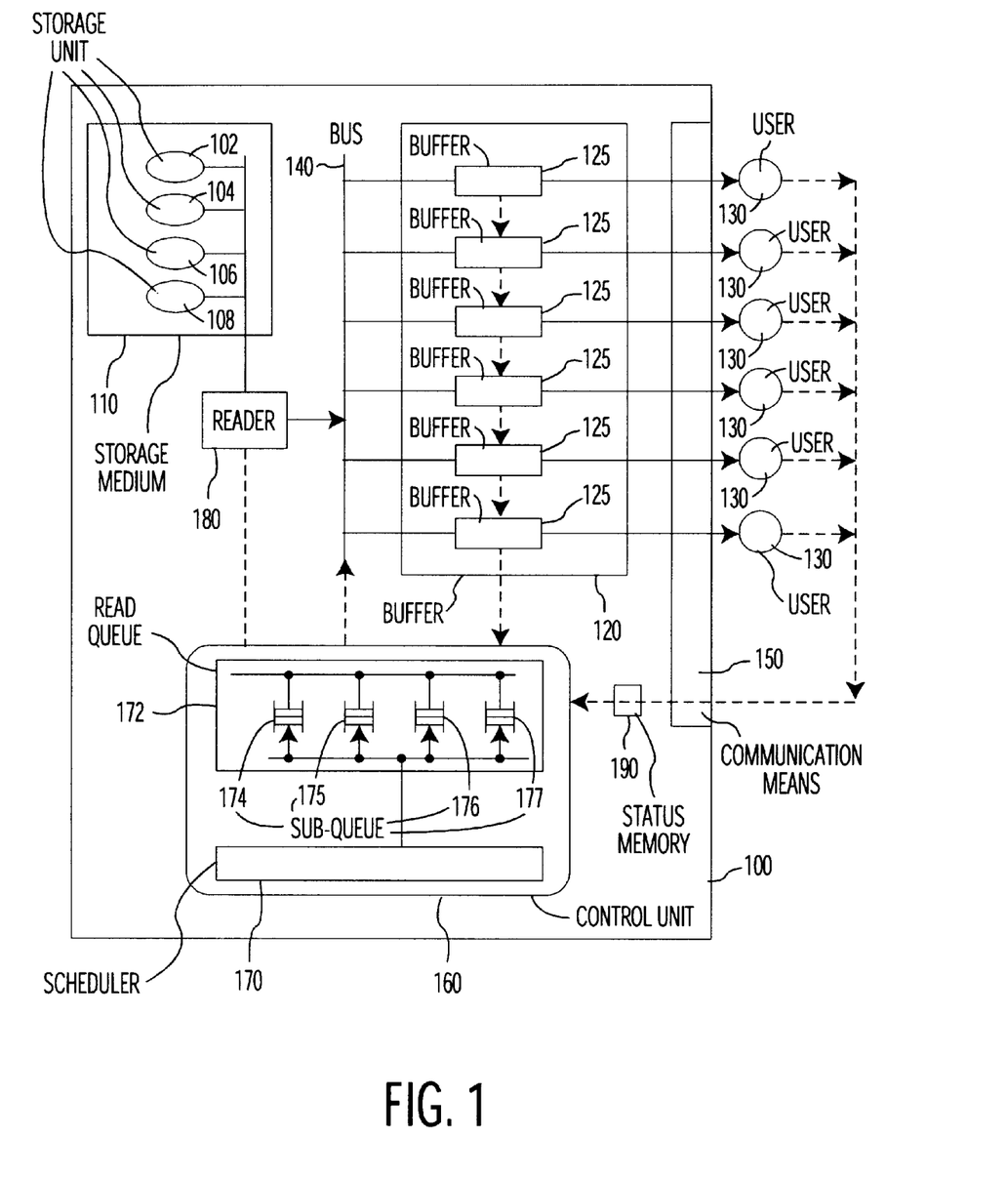
FIG. 1 shows a block diagram of the system according to the invention.

FIG. 1 shows a block diagram of a system 100 according to the invention. An example of such a system 100 is a multimedia server. Multimedia applications can be characterised by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the play-out of the title. The level of interaction is higher and a data stream is typically only consumed by one user. A multimedia server is usually implemented using a file server which is specifically designed to supply continuous data streams of a similar data rate (typically bounded by an identical maximum data rate) for a large number of users in parallel. Usually, one or more multimedia titles are stored on a background storage medium 110. At this moment, normally disks, such as hard disks, are used as the background storage medium 110, based on their large storage capacity at low cost and the possibility of random access. It will be appreciated that also other storage media, such as optical disks, may be used. The storage medium is divided into a plurality of storage units of which, as an example, are shown 102, 104, 106 and 108. The storage medium 100 is, therefore, formed by a cluster of storage units, such as a RAID system. The storage unit, such as a hard disk, may itself be further sub-divided (resulting in a hierarchical cluster). For the purpose of this description, such a sub-divided storage unit is regarded as one storage unit (with a higher bandwidth and/or higher storage capacity than the sub-units within the storage unit). For a typical video-on-demand system, which uses disk-based storage media, the number of storage units forming the storage medium 100 is determined by the required bandwidth. Typically, all data streams are bounded by a same maximum consumption rate of $R_{max}$ data elements per second, where a data element may for instance be a byte. For MPEG-2 encoded material the maximum consumption rate will typically be chosen to be between approximately 2 or 15 Mbits/sec, depending on the desired quality. A system designed to support simultaneously up to $N_{max}$ data streams at least requires substantially $N_{max}*R_{max}/B$ storage units, where B is the guaranteed bandwidth of an individual storage unit. It will be appreciated that in practice the maximum consumption rate for some data streams may be lower, for instance if the corresponding title is of a lower quality or a different type (e.g. audio, whereas most streams relate to a combination of audio and video), than a worst-case situation for which the system usually is designed.

The system 100 comprises a reader 180 for reading data from the storage medium 110. The reader 180 may, for instance, be implemented using a SCSI interface. Advantageously, the storage medium 110 is also included in the system 100. Data is retrieved from the storage medium 100 as a data unit, such a Disk Access Block (DAB) for a disk-based storage medium. Depending on the chosen scheduling algorithm, a preference may be given to reading data as fixed size DABs or as variable sized DABs. DABs which are successively read from a same disk will typically not be stored contiguously on the disk. Usually, DABs which are successively read from the same disk belong to different files (where a file is the collection of blocks belonging to one title) since the disk has to supply DABs for a plurality of data streams in some interleaved manner. To reduce the switching overhead which results from reading non-contiguous DABs, the disk sweeping technique is used. The reader 180 is able to read a number of DABs from the storage unit 110 in one batch. The DABs of the batch are ordered based on their physical track position. For the read operation, the disk head is moved in only one direction (e.g. from an innermost to an outermost position from which data needs to be read or vice versa), only stopping to read the DABs of the batch. In this way, the switching overhead is reduced significantly. It will be appreciated that the storage unit may also be formed by a tape unit. In this case, reading non-contiguous tape access blocks would normally involve winding in arbitrary directions. Now, the tape is wound in one direction starting from reading the first tape access block until the last block of the batch. Also a hierarchy of storage units may be used, where, for instance, a disk acts as a form of cache from which the reader obtains the data, whereas tapes form the background storage used to supply data to the disk. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100. It will be appreciated that the role of the reader, such as controlling the reading, arranging a sweeping sequence and caching read data, may also be distributed, where each of the storage units has its own controller performing these functions. If so, a main task of the reader 180 is to co-ordinate the operations of the various 'intelligent' control units.

Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. For variable data rate streams usually a fixed identical maximum consumption rate of $R_{max}$ data elements per second is assumed, which is used for dimensioning the system (e.g. bandwidth of the system and/or size of storage) in order to ensure that the system still operates in a worst-case situation (e.g. when all data streams consume data at the maximum data rate). Normally, the data is stored in the storage medium 110 and processed by the system 100 in a compressed form. Only at the user 130 the data stream is decompressed, using a decoder. Particularly for a variable rate system, the system 100 may also be able to support VCR like control functions. In such a case, a data stream may be in one of a plurality of states like an active and a halted state, where an active data stream may supply data to a user and a halted data stream may currently not supply data to a user. Typically, if a user temporarily stops consuming data, the stream stays active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated that a slow motion function may be implemented by consuming data at a low rate (the stream remains active) or switching to a new stream (the stream is temporarily halted). The system 100 maintains for the data stream a stream status which indicates the current state. The stream status for one or more data streams may be stored in a status memory 190, such as the main memory (RAM) of the server or special registers.

Data is read from the storage medium 100 for a subset of data streams where the read data is supplied as a time multiplexed stream via the bus 140. In all cases, the storage medium 100 is not capable of simultaneously supplying continuous data streams to all users of the system. Instead, the data for a subset of data streams is read and supplied to the remainder of the system 100 at a higher data rate then consumed by the corresponding data streams. The system 100, therefore, comprises buffers 120 for achieving supply of data at the required rate to the users 130. Usually, the buffers 120 are implemented using RAM. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance. The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 120 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as filling degrees of the buffers, upon which the scheduler 170 bases its decisions. For systems which offer VCR-like controls, the scheduler also receives information regarding the status of a stream. In such systems, typically, control information is received from the users 130 via the communication means 150.

In the system according to the invention, a block of data to be read for a stream may be stored as one data unit, such as a DAB, in one of the storage units, or, alternatively, be stored as several data units. If several data units are used, the data units may be distributed over different storage units. One form is that the block is distributed over all storage units (a same numbers of DABs are read from each storage unit to form the block). Instead of striping the block over all disks, the block may also be striped over a group of disks. If a data block needs to be read for a stream, the scheduler 170 determines which data unit (or data units, if more than one data unit is involved) needs to be retrieved. For this data unit, the scheduler 170 determines in which storage unit the data unit is stored and places a carrier access request in a read queue 172. The carrier access request is associated with the data unit and the determined storage unit (e.g. the carrier access request takes the form of an entry, such as a record or data structure, in a queue, where a field of the entry is used to indicate the data unit and another field indicates the storage unit). Preferably, the read queue 172 comprises for each of the plurality of storage units an associated read sub-queue. Shown are sub-queues 174, 175, 176 and 177, where the subqueue 174 is associated with the storage unit 102, subqueue 175 with storage unit 104, subqueue 176 with storage unit 106, and subqueue 177 with storage unit 108. In this way the scheduler 170 can simply associate a carrier access request with the storage unit by placing the carrier access request for a storage unit in the read sub-queue associated with the storage unit. Cyclically, the scheduler 170 extracts a batch of carrier access requests for a specific storage unit from the read queue and issues the batch to the reader 180. If sub-queues are used, the scheduler 170 can simply extract the batch of carrier access requests for a storage unit from the sub-queue associated with the storage unit. The scheduler 170 performs the cyclic extraction for each of the storage units in an asynchronous manner (i.e. the reading of data from a storage unit does not only end at different moments but is typically also started at different moments). A batch of carrier access requests for a specific storage unit is issued to the reader when the previous batch for the same storage unit has been dealt with (or slightly earlier when the reader is prepared to accept a new batch of carrier access requests). The scheduler 170 may monitor whether a new batch can be issued for a storage unit. Alternatively, the reader 180 may provide a trigger to the scheduler 170 indicating that the previous batch has been completed.

In a further embodiment a block is represented by a plurality of N corresponding data units, where each data unit is stored in a different storage unit. Less than N of the data units are required to reproduce the block. The block can be reproduced from more than one group of up to M of the data units, where 1≦M<N. In most situations each group will be formed by the same number of M data units (although not strictly required). An example of such a storage strategy, is where the block is divided in seven segments and a further segment is formed by using an error correcting code calculated over the seven segments. A simple form of such an error correcting code is calculating a parity over the seven segments (e.g. by XOR-ing all segments together), which in combination with knowledge of which disk has failed allows correction of a detected error. Each of the seven segments and the error coding segment forms then one of the data units and is stored in a different storage unit. More advanced coding schemes may also be used which provide more redundancy (i.e. less data units need to be retrieved to be able to fully reconstruct the block). In the case of using seven data segments and one parity segment, eight different groups of each seven segments exist from which the block can be reconstructed. The groups of data units minimally required to reconstruct the block are distinguished. Since the data units are each stored in a separate storage unit, the groups of data units correspond one to one to groups of storage units. When the scheduler 170 wants to arrange reading of a block it selects one of the groups of storage units such that a load on the storage units is balanced. The load on a storage unit may, for instance, be determined by the number of carrier access request in the sub-queue associated with the storage unit. If possible, also carrier access requests which have already been submitted to the reader 180 but have not yet been serviced may additionally be considered. The load on a group of storage units may be defined as the average load on the storage units of the group, or, for instance, a maximum of the loads on the storage units of the group. The scheduler 170 places for each of the storage unit(s) of the selected group a carrier access request in the read queue. The carrier access request is associated with the storage unit and the data unit of the block stored in the storage unit.

All blocks of all titles in the system may be stored in a redundant form (i.e. reproducible from at least two different groups of data units). Alternatively, some block may be stored only once. For instance, blocks of a subset of all titles in the system are stored in a redundant form. Advantageously, such a subset is formed by the most popular titles (e.g. the collection of titles which cover a predetermined percentage, like 90%, of all accesses by users, or a percentage, such as 10%, of all titles which are accessed most frequently). Alternatively or in combination, the selection of blocks stored in redundant form may correspond to a subset of blocks of a title. For instance, every second block of a title is stored in a redundant form, whereas the other blocks of the title are stored only once. It will be appreciated that many variations are possible. In general, the blocks stored in the storage medium 100 relate to a plurality of titles, where each title (usually stored as a file) comprises a sequence of data blocks. Preferably, each title (or a group of titles) is associated with a predetermined redundancy factor. The redundancy factor of a title relates to a ratio of the number of data units stored in the storage medium for the title and the number of data units of the title. Preferably, the redundancy factor of a title depends on a popularity of the title. Advantageously, for the most popular titles a high redundancy factor is chosen, whereas for 'old favourites' which are accessed less frequently a lower redundancy factor is used. The redundancy factors may be chosen such that for a typical use of the system (i.e. with an average balance between popular and less popular titles) the average redundancy factor is at a desired level. Obviously, the redundancy factor may be chosen for groups of titles, but may also be chosen for individual titles.

In a further embodiment of the system some or all blocks which are stored in a redundant form are simply duplicated (N=2) or multiplicated (N>2). This can be expressed by that the data units corresponding to the block each comprise the entire block. Consequently, only one data unit (M=1) is required for reproducing the block (in contradistinction to the use of some form of error detecting or correcting code where one or more data units of a block can be re-generated from other data units stored in other storage units). Advantageously, the storage units storing the same block have been chosen substantially randomly from the plurality of storage units. The system (or a separate system) comprises means (not shown in the figure) for storing a selection of blocks multiple times in the storage medium, by ensuring that such a block is stored in at least two storage units. Preferably, such a block is stored in exactly two storage units, where the storage units are selected randomly from the set of storage units of the storage medium 110. The selection of the disks is performed separately for each block to be stored multiple times. A (pseudo)random sequence generator may be used to generate a random number within the range of available storage units. For each successive block of the selection of blocks a next random number indicates the storage unit in which the block is to be stored. As will be described below in more detail, selecting the storage units randomly allows a good balancing of the load when retrieving the blocks. Also a heuristic algorithm may be used, which achieves the same result of a statistically 'even' load during playback. Obviously it is preferred that a block which is stored multiple times is stored each time in a different storage unit, since otherwise the multiplication does not result in an improvement of the load balance (nor in an improvement of robustness). This can simply be achieved by, if a generated random number corresponds to a storage unit which already stores the involved block, using a next random number. It will be appreciated that instead of storing a selected block in two storage units the blocks may also be stored in more storage units. The more storage units are used, the less 'random' the assignment of a block to storage units needs to be. It should be noted that "Balanced Allocations" of Y. Azar e.a. ACM Symposium on the Theory of Computing, pp. 593–602, 1994 describes that if n balls are placed in n boxes where for each ball randomly two boxes are selected and the ball is placed into the one which is less full at the moment of placement, with high probability the fullest box contains only ln ln n/ln 2+O(1) balls. This is exponentially less than if the ball was placed in one randomly chosen box, which would result in the fullest box with a high probability containing ln n/ln ln n(1+o(1)) balls. These results demonstrate that, particularly for large number of blocks, duplicating all blocks in full and storing the blocks at random on two disks results in the disks substantially comprising a same number of blocks. For practical purposes, it may be assumed that the number of blocks stored in a specific disk is close to the average number of blocks stored in all disks.

When a new block is required for a data stream, the scheduler 170 determines a set of storage units in which a corresponding data unit is stored. If the block is stored in only one storage unit (i.e. the block does not belong to the selection of blocks which are stored multiple times), the scheduler assigns a read request for reading the block to the storage unit. If the block is stored multiple times, the scheduler 170 chooses one of those storage units and assigns the carrier access request to the chosen storage unit indicating the data unit which corresponds to the block. The scheduler 170 selects the storage unit from the set such that the load on the storage units of the storage medium 100 is balanced.

Simulations have been performed comparing the situation in which the data units are read from the disks by operating all disks synchronously with the situation in which the disks are operated asynchronously. The simulations were performed for a system wherein each block is stored in two randomly selected storage units. In the synchronous system, all batches are issued 'simultaneously' to the reader. Next batches are issued as soon as all previous batches have been completed for all disks. In the asynchronous system, for individual storage units a next batch is issued as soon as the previous batch for the same storage unit has been completed. The results are shown in the following table for a system with 10 disks:

| | | Average response times | |
|---|---|---|---|
| # streams | block size (Mbit) | Synchronous | Asynchronous |
| 100 | 2.9 | 0.26 | 0.09 |
| 110 | 4.1 | 0.35 | 0.12 |
| 120 | 6.7 | 0.53 | 0.18 |
| 130 | 14.4 | 1.07 | 0.34 |

The simulations show that a significant reduction in average-case response times can be achieved by controlling the disks asynchronously. For a system wherein each block is stored in two randomly selected storage units, the response times were on average reduced by a factor of 3. If more streams are active in the system, the performance of the asynchronous implementation improves even further compared to the synchronous implementation.

In an embodiment according to the invention, the scheduler 170 deals with a request for fetching a block for a data stream on an individual basis. Whenever a request arrives (or the scheduler 170 detects on its own initiative that a new block is required), the scheduler selects a group of storage units by determining which of the groups of storage units corresponding to the block has at that moment a lowest load. For determining the load only carrier access requests which have already been assigned are considered. No reassignment takes place of previous read requests, nor is any consideration given to other requests for fetching a block which may already have arrived at the scheduler 170. The only influence of previous carrier access requests is via the load on the storage units resulting from carrier access requests which have already been assigned but for which no data has been read yet. It will be appreciated that in practical circumstances, the scheduler 170 can only take into consideration assigned carrier access requests of which the scheduler 170 is still able to determine the status. As an example, the reader 180 (or individual controllers of the storage units) may be able to perform in hardware some form of internal scheduling to optimise the sweeping sequence. Once a carrier access request has been issued, the scheduler 170 may no longer be able to determine when the actual data unit is going to be read or is being read. As such, the scheduler 170 may regard such disk access read requests as being completed and no longer contributing to the load. It will be appreciated that this assignment mechanism can be used for any form of redundant storing (no full multiplication is required).

In an alternative embodiment of the system according to the invention, the scheduler 170 balances the load on the storage units by dealing with a group of more than one request for fetching a block at a time. Not only does this allow for a better balance, it also matches a cyclical approach commonly used in video servers, where in each cycle it is first determined for which data streams a block needs to be read and next the corresponding carrier access requests are assigned. According to the invention, the scheduler 170 first determines a group of blocks to be read within a next cycle (note that this is a higher level cyclic operation independent of the sweeping operations of the individual storage units). Next, the scheduler 170 selects for all blocks in the group the group of storage units from which data units should be read such that the load on the storage units is balanced. For determining the load, only the carrier access requests already in the read queue and associated with blocks of the group are considered. In this way, relatively simply the load can be balanced for the involved storage units (i.e. those storage units comprising a copy of one of the data units of one of the blocks to be read). Since typically the group of blocks (and thus the number of data units) will be considerably larger than the total number of storage units, usually all storage units will be involved. This allows achieving a reasonable balance of the load over all storage units. Alternatively, the scheduler 170 may also consider the load resulting from an assignment of a previous group, if those data units have not all been read yet.

Figure 2:
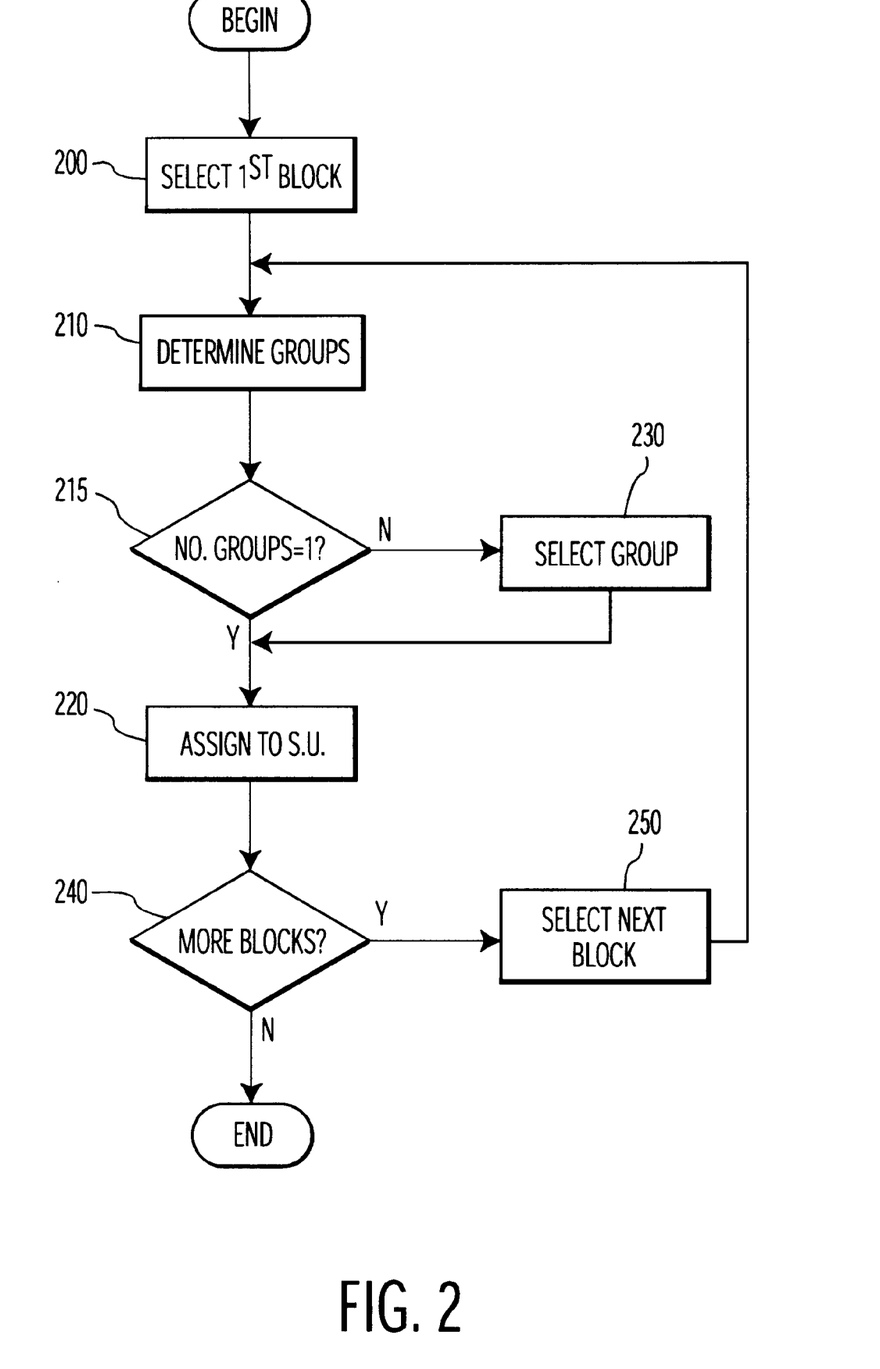
FIG. 2 shows a flow diagram of a linear sequential scheme for selecting storage units for playback.

FIG. 2 illustrates a flow diagram of the operation of the scheduler 170 in a further embodiment of the system according to the invention, wherein the scheduler sequentially deals with the blocks of the group. It is assumed that some sequence exists in the blocks. The sequence itself is not important. The sequence may, for instance be, the sequence in which the scheduler 170 receives the request for fetching the block. An alternative sequence may be based on the sequence of the buffers for which the block is intended. In step 200 the scheduler selects a first block of the sequence. A selected block is processed in steps 210, 220 and optionally 230. In step 240 the scheduler 170 tests whether all blocks of the group have been processed. If so, the operation is finished. If not, in step 250 a next block of the group is selected and the process is continued at step 210. For each block, the scheduler 170 determines in step 210 the groups of storage units with data units from which the block can be reproduced. In step 215 an optional test is performed which may be used in systems in which not all blocks are stored in a redundant form. If the block can be reproduced from only one group of storage units (i.e. the block does not belong to the selection of blocks which are stored redundantly), the scheduler assigns in step 220 a carrier access request for reading the data unit(s) corresponding to the block from the involved storage unit(s). If the block is stored in a redundant form, the scheduler 170 chooses in step 230 one of groups of storage units and assigns in step 220 the carrier access request(s) for reading data unit(s) of the block to the storage unit(s) of the group. The scheduler 170 selects the group of storage units which at that moment has a lowest load resulting from carrier access requests which have already been assigned for previously processed blocks of the group.

This algorithm is further referred to as the Linear Assignment algorithm.

In an embodiment according to the invention, the scheduler 170 determines whether the load balance on the storage units resulting from carrier access requests in the read queue can be improved. If so, the scheduler 170 ensures that for at least one block different data unit(s) are read than initially intended. This is performed by removing the carrier access request(s) resulting from the block from the read queue. Next, the scheduler 170 re-selects a group of storage unit(s) capable of reproducing the block. For instance, the group may be selected (from the groups of storage unit(s) associated with the block) which at that moment has/have a lowest load. Finally, the scheduler 170 places for each of the storage unit(s) of the selected group a carrier access request in the read queue. The carrier access request is associated with the storage unit and the data unit of the block stored in the storage unit.

Figure 3:
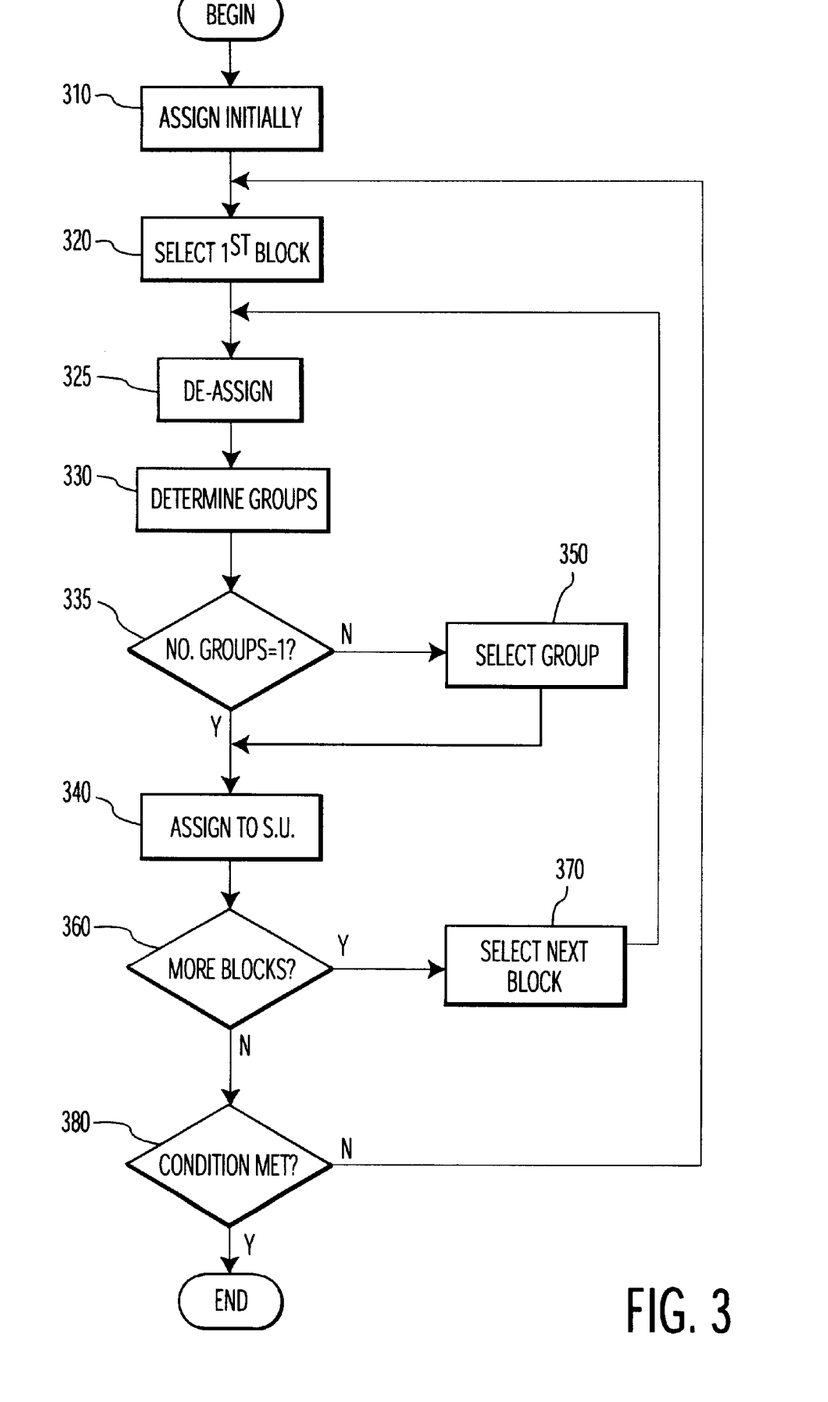
FIG. 3 shows a flow diagram of an iterative linear sequential scheme for selecting storage units for playback.

FIG. 3 shows a flow diagram of the operation of the scheduler 170 in a further embodiment of the system according to the invention. In step 310, the scheduler 170 performs an initial assignment. The scheduler 170 selects for each of the blocks of the group a preliminary group of storage unit(s) and assigns the corresponding carrier access request(s) to the storage units of the preliminary selected group of storage unit(s). The selection process may be simple, like always selecting a first group of storage units (assuming that some form of a sequential ordering of the groups is established) or randomly selecting a group of storage units from the possible groups. Preferably, the initial assignment of step 310 is performed using the sequential assignment scheme of FIG. 2 which considers the balance within the group of blocks. Following the initial assignment, the scheduler 170 starts an iterative procedure wherein for each block of the group a group of storage units is re-selected and the corresponding carrier access request(s) re-assigned. Preferably, the re-assignment is performed in the following way, which corresponds to the scheme shown in FIG. 2. Assuming again that some sequence exists in the blocks, the scheduler 170 selects in step 320 a first block of the sequence. A selected block is processed in steps 325, 330, 340 and 350. In step 360 the scheduler 170 tests whether all blocks of the group have been processed. If so, a loop of the iterative procedure has finished. If not, in step 370 a next block of the group is selected and the process is continued at step 325. In step 380, the scheduler 170 checks whether a condition for terminating the loop has been met. If so, the loop is exited, otherwise a next loop is started at step 320. The condition itself may be a simple condition, like whether the loop has been executed a predetermined number of times or whether the maximum load resulting from the last loop is the same as before the loop was started. For each block, the scheduler 170 de-assigns in step 325 carrier access request(s) which were already assigned for reading data unit(s) of the block. Next, the scheduler 170 determines in step 330 which groups of storage units correspond to the block (i.e. can reproduce the block). In step 335 an optional test is performed which may be used in systems in which not all blocks are stored in a redundant form. If the block is stored in only one group of storage units (i.e. the block does not belong to the selection of blocks which are stored redundantly), the scheduler assigns in step 340 carrier access request(s) for reading data unit(s) of the block to the storage unit(s) of the group. If the block is stored in a redundant form, the scheduler 170 chooses in step 350 one of the groups of the storage units and assigns in step 340 the carrier access request(s) for reading the data unit(s) of the block to the storage unit(s) of the selected group. The scheduler 170 selects the group of storage unit(s) which at that moment has/have a lowest load resulting from carrier access requests which have already been assigned for previously processed blocks of the group. This algorithm is further referred to as the Linear Reassignment algorithm, wherein the initial assignment is performed by the Linear Assignment algorithm.

Figure 4A:
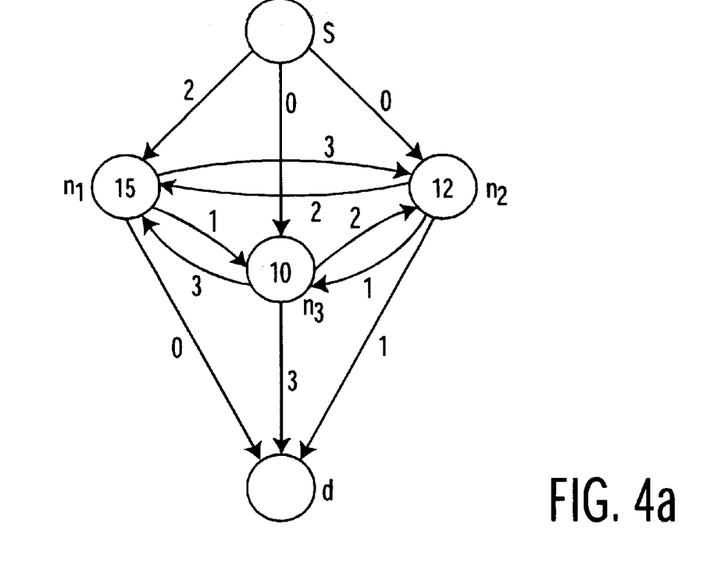
FIGS. 4a, 4b and 4c illustrate a scheme for selecting storage units for playback based on solving a maximum flow through a network of nodes.
Figure 4B:
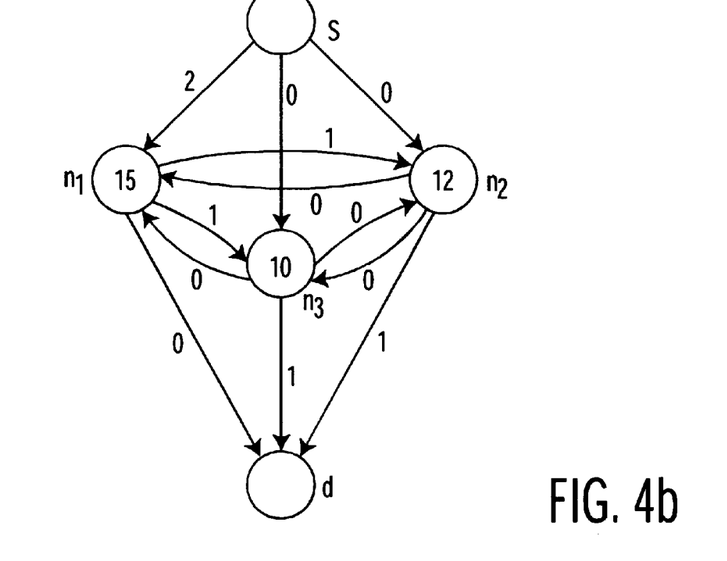
Figure 4C:
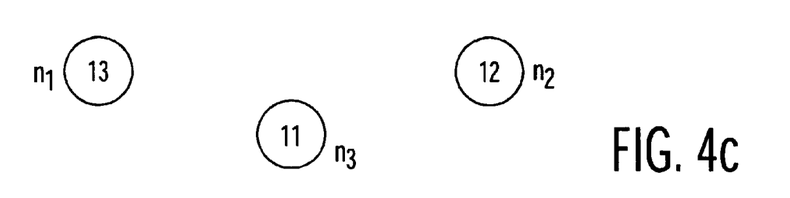

In a further embodiment according to the invention, the scheduler 170 assigns carrier access requests for the blocks of the group according to an assignment derived from solving an analogous maximum flow problem. The assignment algorithm is described for the situation in which a block is fully multiplicated (i.e. the data units corresponding to the block fully contain the block). A person skilled in the art will be able to use the same principle for the situation in which a block is distributed over several storage units. Like in step 310 of FIG. 3, the scheduler 170 first performs an initial assignment by preliminary selecting for each of the blocks of the group a storage unit and assigning the corresponding carrier access request to the preliminary selected storage unit. An analogous maximum flow problem is defined in the following way. A network of nodes $n_i$ is defined containing for each storage unit $s_i$ a corresponding node (vertex) $n_i$. The network also comprises a source node (s) and a drain (or: sink) node (d). Each node $n_i$ is connected to $n_j$ ($n_i \neq n_j$) via a corresponding arc (directed edge) with a capacity corresponding to the number of blocks which are stored in both $s_i$ and $s_j$ and for which a corresponding carrier access request has been assigned to $s_i$. As such the capacity indicates the number of blocks that can be re-assigned from $s_i$ to $s_j$. FIG. 4A illustrates a network for three storage units $s_1$ to $s_3$, represented by the respective nodes $n_1$ to $n_3$. In the example, it is assumed that the respective initial loads on the storage units $s_1$ to $S_3$ are 15, 12 and 10 (as indicated in the centre of each corresponding node). Next to each arc from one node to another is indicated how many carrier access requests can be reassigned between the storage units corresponding to the nodes (e.g. in the example, three blocks can be re-assigned from $s_1$ to $s_3$ and two from $s_3$ to $s_1$). The problem is defined such that it can be determined whether the maximum load $l_{max}$ on the storage units can be lowered with k units, where the load results from the preliminary assignment of carrier access requests to the storage units. To this end, the source s is connected to each node $n_i$ via a corresponding arc with a capacity of max($k+l_i-l_{max}$, 0). In this formula, $l_i$ corresponds to a load on storage unit $s_i$ resulting from the carrier access requests which have been preliminary assigned to $s_i$. Consequently, the maximum load $l_{max}$ is given by $l_{max}=\max\{l_i\}$ over all storage units. In the example of FIG. 4A, $l_{max}=15$. Furthermore, each node $n_i$ is connected to the drain d via a corresponding arc with a capacity of max($l_{max}-l_i-k$, 0). In the example of FIG. 4A, k is chosen to be 2 and the corresponding capacities of the source to the respective nodes and from the nodes to the drain are shown. Next, the maximum flow through the network is calculated. FIG. 4B shows a possible outcome of the calculated flow. Next to each arc the flow is indicated (unlike FIG. 4A where the capacity was indicated). The flow in an arc may not exceed its capacity. The capacities of the arcs from the source s to the respective nodes have been defined such that if and only if the calculated flow from the source s to the respective nodes matches the capacity (i.e. the capacity is fully used), the maximum load indeed can be lowered by k units. As an example, if the load on a node equals the maximum load $l_{max}$, it is desired to lower the load on this node with k units, reflected by a capacity of max(k+$l_i$−$l_{max}$, 0)=max(k+$l_{max}$−$l_{max}$, 0)=k. Similarly, for a node with a load of $l_{max}$−1 it is desired to lower the load with k−1 unit, reflected by a capacity of max(k+$l_{max}$−1−$l_{max}$, 0)=max (k−1, 0)=k−1 (assuming k>=0). The formula also expresses that a load on a node of $l_{max}$−k (or even lower) does not need to be lowered. Similarly, the capacities of the arc from the respective nodes to the drain d express with how many units the load on the nodes can be increased without exceeding the desired maximum load of $l_{max}$−k. It will be appreciated that the calculated flow from the nodes to the drain may be lower than the respective capacities, reflecting that the system is not fully loaded (in FIG. 4B the flow from $n_3$ to the drain is 1, whereas the capacity is 3, indicating that the load on $n_3$ may still be increased by up to two more blocks). If the calculated maximum flow shows that the maximum load can be lowered by k units, the scheduler 170 re-assigns a number of carrier access requests from $s_i$ to $s_j$ ($s_i \neq s_j$) that equals the resulting calculated flow from $n_i$ to $n_j$. FIG. 4C shows a re-assignment according to the calculated flows shown in FIG. 4B. For calculating the maximum flow through the network any suitable algorithm, such as the well-known Ford&Fulkerson algorithm, may be used. Details of maximum flow principles are described in "Algorithmic Graph Theory", Alan Gibson, Cambridge University Press, 1989, pages 96–106.

The maximum load on storage units of a well-balanced system will be in between (including the boundaries) the upwardly rounded average load I V, on the storage units and the maximum load $l_{max}$ resulting from the preliminary assignment. So, k may be chosen between 1 and $l_{max}$−$l_{avg}$ (if $l_{max}$ equals $l_{avg}$ the load can not be lowered). To determine the maximum value for k for which the maximum load still can be lowered, various schemes may be used. For instance, starting at one of the boundaries successively all values of k may be tried until the desired result is reached, e.g. starting with k=$l_{max}$−$l_{avg}$ the maximum flow is calculated; if not successful k is lowered until successful or the last value of k (k=1) has been unsuccessfully tried. Also a 'binary search' may be performed, where k is chosen to be approximately in the middle of interval. If successful, the process is repeated with the upper half of the interval, otherwise with the lower half of the interval. The process is repeated until the value of k is reached.

Figure 5:
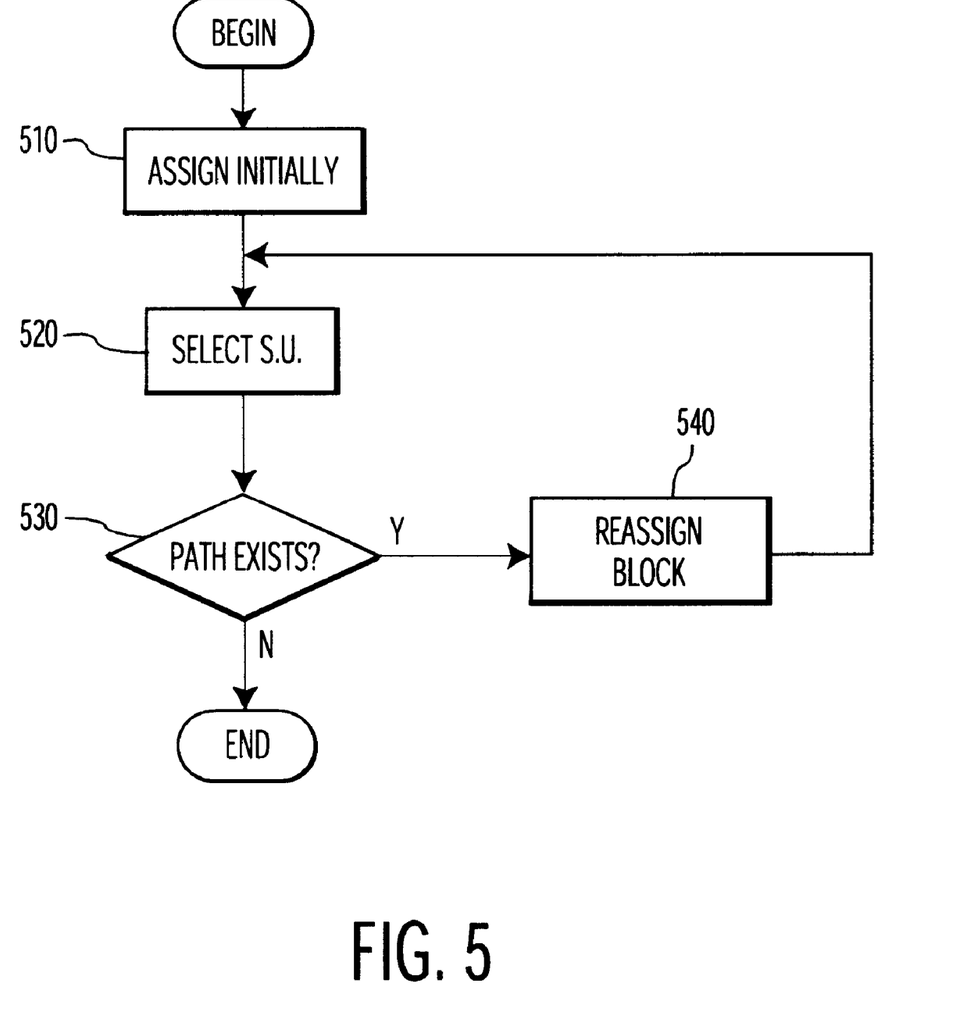
FIG. 5 illustrates an alternative iterative procedure for selecting storage units for playback

In an embodiment of the system according to the invention, a same result as obtainable by solving the described algorithm based on the maximum flow problem, is achieved by the scheduler 170 performing an iterative procedure, which is illustrated in FIG. 5. Like before, the first step 510 is to perform an initial assignment by selecting for each of the blocks of the group a preliminary storage unit and assigning the corresponding carrier access request to the preliminary selected storage unit. Following the initial assignment, the scheduler 170 starts an iterative procedure wherein an attempt is made to reassign a carrier access request from a storage unit with maximum load to a storage unit with a load less than $l_{max}$−1. The reassignment may be direct from one storage unit to another, but also a chain of reassignments may occur. In step 520 the scheduler 170 selects a storage unit $s_i$ with a load on $s_i$ being equal to a maximum load $l_{max}$ on the plurality of storage units. The load results from currently assigned carrier access requests. It will be appreciated that more than one storage unit may have the maximum load. If so, any of these may be selected (e.g. the first one of these). In step 530 the scheduler determines whether a path exists from $s_i$ to a different storage unit $s_j$ with a load less than $l_{max}$−1. It is intended to move one read request from $s_i$ to $s_j$ via the path, reducing the load on $s_i$ with one and increasing the load on $s_j$ with one. To get an improvement the resulting load on $s_j$ should be less than $l_{max}$, implying that the initial load on $s_j$ should be less than $l_{max}$−1. To be able to move a read request along the path, the path is formed by a sequence of storage units $s_{p1}$, $s_{p2}$, ..., $s_{pL}$, with $s_i$=$s_{p1}$ and $s_j$=$s_{pL}$ and wherein for each pair $s_{pk}$, $s_{p(k+1)}$ a carrier access request can be reassigned from $s_{pk}$ to $s_{p(k+1)}$, with k ranging from 1 to L−1. Any suitable algorithm may be used for determining whether such a path exists. As an example, a graph as illustrated in FIG. 4 for the storage units $s_1$ to $s_3$ (represented by nodes $n_1$ to $n_3$) may be formed and a tree search performed through the graph. If a path exists, the scheduler 170 reassigns in step 540 a carrier access request from $s_{pk}$ to $s_{p(k+1)}$ for k ranging from 1 to L−1. Next, the procedure is restarted at step 520. At that moment the load on $s_i$ has been lowered by one. If still other storage units have a same maximum load as $s_i$ had before, one of these units will be selected in step 520. If $s_i$ was the only storage unit (or the last storage unit) with that maximum load, this will automatically have lowered the maximum load on the system with one. As a result $s_i$ now again has a maximum load (which usually also some other storage units have), albeit one lower than before. This process may be repeated, if desired. Preferably, the process is performed in the background (whenever the scheduler or the system on which the scheduler runs has sufficient time left). Any repetition of the process may be terminated (and later on restarted) if for a storage unit with maximum load no path can be found for lowering the load.

The behaviour of three algorithms, being Linear Assignment (LA), Linear Reassignment and Maximum Flow Assignment (MFA), has been simulated. For m=5 to 30 disks (in steps of 5) a simulation has been performed, wherein further the number of active streams has been varied with the number of streams divided by the number of disks ranging from 5 to 30 (in steps of 5). As such, the number of active streams in the system ranges from 25 to 900. The following table shows the results of the simulation for 1,000,000 sweeps. All blocks have been fully duplicated and in each sweep a data block is fetched for each active stream, reflecting a worst case scenario wherein all streams continuously comsume at the maximum rate. Of each group of three results shown in the table, the top result relates to the LA algorithm, the middle result to the LR algorithm and the lower result to the MFA algorithm. Each result shows the maximum observed load, where the number of times that the maximum load is observed is given between parentheses. For reasons of simplicity of the simulation, the simulations have been performed for a system wherein the disks are operated synchronously. Equally good results can be achieved for an asynchronous implementation of the system.

|         | # Streams/# disks |            |            |            |            |            |
|---------|-------|------------|------------|------------|------------|------------|
| # Disks | 5     | 10         | 15         | 20         | 25         | 30         |
| 5       | 8(18) | 13(31)     | 18(29)     | 23(34)     | 28(25)     | 33(28)     |
|         | 7(51) | 12(21)     | 17(1)      | 21(1776)   | 26(381)    | 31(68)     |
|         | 7(41) | 12(21)     | 17(1)      | 21(18)     | 26(3)      | 30         |
| 10      | 8(142)| 13(191)    | 18(207)    | 23(184)    | 28(198)    | 33(166)    |
|         | 7(54) | 11(396117) | 16(213706) | 21(114426) | 26(61619)  | 31(32999)  |
|         | 7(1)  | 11(23661)  | 16(3193)   | 21(501)    | 26(55)     | 31(11)     |
|         | 8(347)| 13(409)    | 19(1)      | 23(441)    | 28(440)    | 33(447)    |
|         | 7(96) | 11(694889) | 16(488578) | 21(336106) | 26(228820) | 31(156811) |
|         | 6(313653) | 11(46707) | 16(7107) | 21(1113)   | 26(173)    | 31(28)     |
| 20      | 8(595)| 14(1)      | 18(745)    | 23(728)    | 28(718)    | 33(719)    |
|         | 7(147)| 11(858807) | 16(692840) | 21(538545) | 26(413701) | 31(314418) |
|         | 6(421558) | 11(70447) | 16(11215) | 21(1836)  | 26(327)    | 31(52)     |
| 25      | 8(874)| 13(995)    | 18(981)    | 23(1059)   | 28(1034)   | 33(1033)   |
|         | 7(242)| 11(936186) | 16(822812) | 21(692345) | 26(570789) | 31(464858) |
|         | 6(512112) | 11(93623) | 16(15619) | 21(2771)  | 26(445)    | 31(79)     |
| 30      | 8(1134)| 13(1327)  | 18(1400)   | 23(1340)   | 28(1341)   | 33(1363)   |
|         | 7(297)| 12(1)      | 16(900205) | 21(799922) | 26(693882) | 31(591426) |
|         | 6(589538) | 11(116981) | 16(20072) | 21(3476) | 26(648)    | 31(134)    |

The simulations show that with the relatively simple LR algorithm good results can be achieved, with in almost all situations a same maximum load as obtained with the MFA algorithm (which gives the best load balance achievable), although the number of times the maximum load is observed is higher than for the MFA algorithm. The simulations also demonstrate that by fully duplicating blocks and storing the blocks randomly, a maximum load can be achieved which, particularly for the LR and MFA algorithm, is for most simulated situations only 3–10% higher than the average load, which is the lower limit. As such the balancing which can be achieved is very good.

What is claimed is:

1. A system for retrieving blocks of data, such as audio and/or video data, from a storage medium and supplying the blocks in the form of a plurality of data streams to users; the storage medium including a plurality of record-carrier based storage units; the block including at least one data unit, where a data unit is stored on one of the storage units; the system comprising:

reader means, for each of the storage units, for servicing a batch of carrier access requests by reading a corresponding batch of data units in a single relative movement of a reading head of the storage unit with respect to the record-carrier of the storage unit; each unit of the batch of data units being associated with one of the carrier access requests of the batch of carrier access requests; and scheduler means for controlling reading of data blocks for the data streams from the storage units by:
determining for at least one data unit of each block in which storage unit the data unit is stored and placing a carrier access request in a read queue; the carrier access request being associated with the data unit and the determined storage unit; and
cyclically extracting for each of the plurality of storage units a batch of carrier access requests associated with the storage unit from the read queue in an asynchronous manner, by for each individual storage unit, issuing a batch of carrier access requests for the storage unit to the reader in response to the reader having substantially completed reading data units for a previous batch of carrier access requests for the storage unit; and
issuing the batches to the reader.

2. A system as claimed in claim 1, in which:
the read queue includes for each of the plurality of storage units, an associated read sub-queue; and
the scheduler means is for:
associating a carrier access request with the storage unit by placing the carrier access request for a storage unit in the read sub-queue associated with the storage unit; and
extracting the batch of carrier access requests for a storage unit from the sub-queue associated with the storage unit.

3. A system as claimed in claim 1, in which a predetermined selection of blocks includes a plurality of N corresponding data units, where each data unit is stored in a different storage unit and the block can be reproduced from a plurality of different groups of up to M of the corresponding data units, $1 \leq M < N$; the groups being associated with the block; each of the groups of data unit(s) having a one-to-one correspondence with a group of storage unit(s) which store the data unit(s) of the group; and
in which the scheduler means is for controlling reading of a block of the selection of blocks by:
selecting a group of storage unit(s) from the plurality of groups of storage unit(s) associated with the block such that a load on the storage units is balanced; and
placing for each of the storage unit(s) of the selected group a carrier access request in the read queue; the carrier access request being associated with the storage unit and the data unit of the block stored in the storage unit.

4. A system as claimed in claim 3, in which for a further selection of the predetermined selection of blocks, the corresponding data units each comprise the entire block ($N \geq 2$; $M=1$); and the storage units storing the same block having been chosen substantially randomly from the plurality of storage units.

5. A system as claimed in claim 3, wherein the scheduler in response to a request for fetching a block for a data stream, is for selecting a group of storage units by determining which of the plurality of groups of storage units corresponding to the block has at that moment a lowest load resulting from carrier access requests already in the read queue.

6. A system as claimed in claim 3, wherein the scheduler means is for balancing the load on the plurality of storage units by cyclically:

determining a group of blocks to be read within a next cycle; and performing for the blocks of the group, the selection of the group of storage units such that the load on the plurality of storage units resulting from the carrier access requests already in the read queue and associated with blocks of the group is balanced.

7. A system as claimed in claim 6, wherein the scheduler means is for selecting the storage unit by processing the blocks of the group of blocks in sequence and for each block selecting a group of storage unit(s) from the plurality of groups of storage unit(s) associated with the block which at that moment has/have a lowest load resulting from carrier access requests which have already been placed in the read queue for blocks of the group of blocks.

8. A system as claimed in claim 3, in which the scheduler means is for balancing the load on the plurality of storage units by:

determining whether a load balance on the storage units resulting from carrier access requests in the read queue can be improved; and if so, for at least one block:

removing for each of the storage unit(s) of group of storage units selected for the block the carrier access request from the read queue;

re-selecting a group of storage unit(s) from the plurality of groups of storage unit(s) associated with the block which at that moment has/have a lowest load; and placing for each of the storage unit(s) of the selected group a carrier access request in the read queue; the carrier access request being associated with the storage unit and the data unit of the block stored in the storage unit.

9. A system as claimed in claim 8, wherein the scheduler means is for determining whether the load balance can be improved and, if so, to re-associate carrier access requests by:

selecting a storage unit $s_i$ with a load on $s_i$ being equal to a maximum load $l_{max}$ on the plurality of storage units, where the load on a storage unit results from carrier access requests currently associated with the storage unit;

determining whether a path exists from $s_i$ to a storage unit $s_j$ with a load less than $l_{max}-1$, where the path is formed by a sequence of storage units $s_{p1}, s_{p2}, \ldots, s_{pL}$, with $s_i=s_{p1}$ and $s_j=s_{pL}$ and wherein for each pair $s_{pk}, S_{p(k+1)}$ a carrier access request can be re-associated with $s_{p(k+1)}$ instead of $s_{pk}$, with k ranging from 1 to L−1; and if a path exists: re-associating a carrier access request with $s_{p(k+1)}$ instead of $s_{pk}$ for k ranging from 1 to L−1.

* * * * *